United States Patent
Finley, Jr. et al.

(10) Patent No.: US 7,493,103 B2
(45) Date of Patent: Feb. 17, 2009

(54) METHOD AND APPARATUS TO TRANSFER DATA AND DETECT WEAK SIGNALS

(75) Inventors: Paul Bernell Finley, Jr., Austin, TX (US); Daniel Nhiem Nguyen, Austin, TX (US); Kim-Khanh Vu Tran, Austin, TX (US); Vi Trieu Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/897,206

(22) Filed: Jul. 22, 2004

(65) Prior Publication Data

US 2006/0019609 A1    Jan. 26, 2006

(51) Int. Cl.
*H04L 12/58* (2006.01)
(52) U.S. Cl. .............. 455/412.1; 455/432.1; 455/466; 455/66.1; 455/421
(58) Field of Classification Search .............. 455/412.1, 455/466, 421, 422.1, 432.1, 66.1
See application file for complete search history.

(56) References Cited

U.S. PATENT DOCUMENTS

| | | | |
|---|---|---|---|
| 5,923,485 A * | 7/1999 | Ito .............. 360/31 |
| 6,009,356 A * | 12/1999 | Monroe .............. 701/14 |
| 6,147,975 A * | 11/2000 | Bowman-Amuah ......... 370/252 |
| 6,259,892 B1 * | 7/2001 | Helferich .............. 340/7.2 |
| 6,279,050 B1 * | 8/2001 | Chilton et al. .............. 710/20 |
| 6,445,918 B1 * | 9/2002 | Hellander .............. 455/423 |
| 6,591,101 B1 * | 7/2003 | Shimbori .............. 455/435.1 |
| 6,667,962 B1 * | 12/2003 | Lee et al. .............. 370/335 |
| 6,721,572 B1 | 4/2004 | Smith et al. |
| 6,735,505 B2 * | 5/2004 | Levine .............. 701/35 |
| 6,819,932 B2 * | 11/2004 | Allison et al. .............. 455/466 |
| 6,922,561 B2 * | 7/2005 | Chen et al. .............. 455/435.1 |
| 6,931,255 B2 * | 8/2005 | Mekuria .............. 455/466 |
| 6,944,440 B1 * | 9/2005 | Kim .............. 455/412.1 |
| 7,003,304 B1 * | 2/2006 | Helferich .............. 455/458 |
| 7,024,178 B2 * | 4/2006 | Uchimura .............. 455/412.1 |
| 7,039,428 B1 * | 5/2006 | Helferich .............. 455/458 |
| 7,072,641 B2 * | 7/2006 | Satapathy .............. 455/412.1 |
| 7,076,245 B1 * | 7/2006 | Satapathy .............. 455/421 |
| 7,228,145 B2 * | 6/2007 | Burritt et al. .............. 455/519 |
| 7,254,169 B1 * | 8/2007 | Steiner et al. .............. 375/227 |
| 2001/0020892 A1 * | 9/2001 | Helferich .............. 340/7.3 |
| 2003/0045292 A1 | 3/2003 | Kim .............. 455/437 |
| 2003/0134617 A1 * | 7/2003 | Duerk et al. .............. 455/412 |
| 2003/0157945 A1 * | 8/2003 | Chen et al. .............. 455/458 |
| 2003/0190914 A1 * | 10/2003 | Shimbori .............. 455/435.1 |
| 2004/0029602 A1 * | 2/2004 | Kunihiro .............. 455/500 |
| 2004/0039867 A1 * | 2/2004 | Apfeldorfer et al. .............. 711/1 |
| 2004/0203645 A1 * | 10/2004 | Forman et al. .............. 455/414.1 |
| 2004/0235523 A1 * | 11/2004 | Schrire et al. .............. 455/558 |
| 2006/0009995 A1 * | 1/2006 | Kaminski et al. .............. 705/1 |
| 2006/0019650 A1 * | 1/2006 | Kedem .............. 455/422.1 |
| 2006/0025142 A1 * | 2/2006 | Hamilton .............. 455/446 |

* cited by examiner

*Primary Examiner*—Matthew D. Anderson
*Assistant Examiner*—April S Guzman
(74) *Attorney, Agent, or Firm*—Duke W. Yee; Matthew W. Baca; Wayne P. Bailey

(57) ABSTRACT

A method, apparatus, and computer instructions for a communications device transferring data. A signal strength is received for a communications link used to transfer data to a destination. In response to the signal strength less than a threshold, the data is cached in the communications device to form cached data. In response to a loss and reestablishment of the communications link, the cached data is sent to the destination.

9 Claims, 2 Drawing Sheets

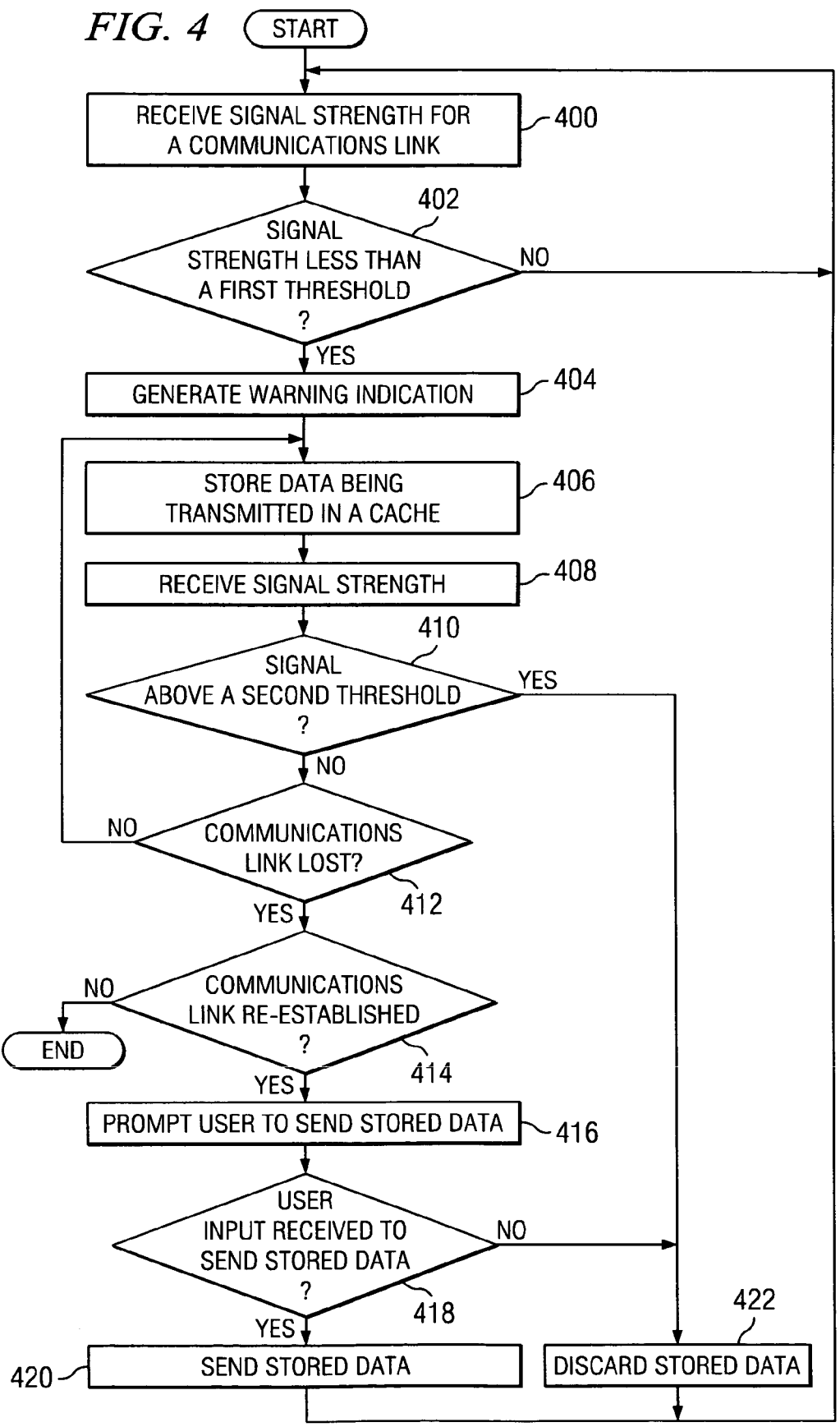

METHOD AND APPARATUS TO TRANSFER DATA AND DETECT WEAK SIGNALS

BACKGROUND OF THE INVENTION

1. Technical Field

The present invention relates generally to an improved data processing system and in particular to a method and apparatus for processing data. Still more particularly, the present invention relates to a method, apparatus, and computer instructions for transferring data and detecting weak signals.

2. Description of Related Art

Millions of people in the United States and around the world use mobile phones. These mobile communications devices allow people to talk to anyone from just about any location. Mobile phones have wireless transmitters built into them for sending data over a wireless communications link. These phones communicate with base stations to exchange data. As a result, a mobile phone user may communicate with others as long as they are within range of a tower for a base station. These towers are typically formed from a steel pole or a lattice structure that rises hundreds of feet into the air. Transmitters also may be located on buildings or other structures. The different base stations and towers form cells in which frequencies may be reused so that many people may simultaneously use mobile phones with a limited number of channels.

As a user of a mobile phone moves relative to a base station, the signal strength changes. As the user moves towards a base station, the signal strength increases. When the user moves away from a base station, the signal strength diminishes. In theory, mobile communications networks are designed to provide coverage such that sufficient signal strength is present throughout the system. In practice, however, weak signals may occur due to unforeseen circumstances, such as hills, buildings, structures, or other elements that may interfere with the signal strength between the mobile phone and the base station. Mobile phone users experience dropped phone conversations everyday. These drops occur because the signal strength drops below the level needed to transfer data for the phone conversations. At some point, the communications link for the call is terminated or dropped. In many cases, the user may be unaware that part of the conversation has not been heard by the receiver of the call because the user is unaware of when the conversation is no longer transmitted. As a result, the user must wait for the signal strength to improve to reestablish the call or communications link with the callee and find out what portion of the conversation was not heard by the callee. In some cases, the communications link is lost such that the caller must reinitiate the call. At that point, the user then must repeat that portion of the conversation.

Thus, it would be advantageous to have an improved method, apparatus, and computer instructions for detecting weak signals and for reducing the need for a user to repeat a portion of a conversation.

SUMMARY OF THE INVENTION

The present invention provides a method, apparatus, and computer instructions for a communications device transferring data. A signal strength is received for a communications link used to transfer data to a destination. In response to the signal strength less than a threshold, the data is cached in the communications device to form cached data. In response to a loss and reestablishment of the communications link, the cached data is sent to the destination.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process for transferring data and detecting weak signals in accordance with a preferred embodiment of the present invention.

DETAILED DESCRIPTION OF THE PREFERRED EMBODIMENT

Figure 1:
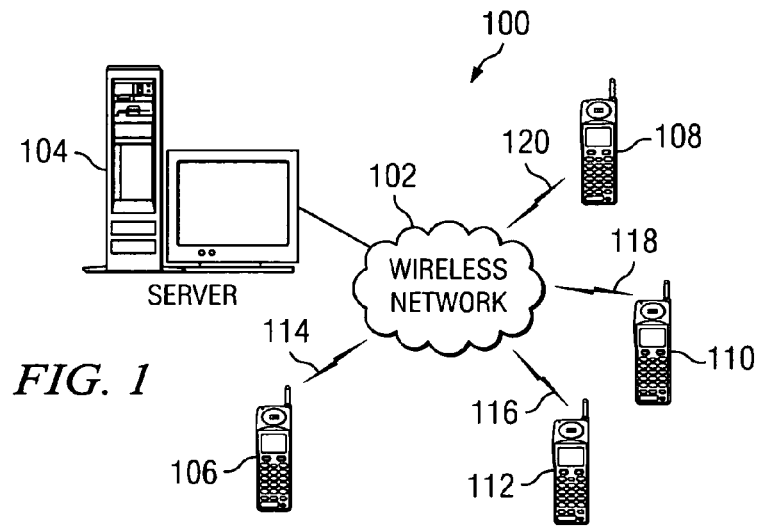
FIG. 1 is a pictorial representation of a communications system in which the present invention may be implemented.

With reference now to the figures, FIG. 1 depicts a pictorial representation of a communications system in which the present invention may be implemented. Communications system 100 is a network of computers and communications devices in which the present invention may be implemented. Communications system 100 contains a network 102, which is the medium used to provide communications links between various devices and computers connected together within communications system 100. Network 102 may include connections, such as wire, wireless communication links, or fiber optic cables. Specifically, network 102 includes wireless communications links for providing voice and data transmissions to mobile devices, such as mobile phones and person digital assistance.

In the depicted example, server 104 is connected to network 102. Server 104 may provide various services for communications devices, such as mobile phones 106, 108, 110, and 112. In these illustrative examples, mobile phones 106, 108, 110, and 112 transfer data, such as voice through wireless communications links 114, 116, 118, and 120. Network data processing system 100 may include additional servers, clients, and other communications devices not shown. FIG. 1 is intended as an example, and not as an architectural limitation for the present invention.

The present provides a method, apparatus, and computer instructions for allowing a user to avoid having to repeat a portion of a conversation when a signal strength drops below an acceptable level needed to transfer data for that conversation. The mechanism of the present invention may be implemented in mobile communications devices, such as mobile phones 106, 108, 110, and 112. The mechanism detects when a signal strength is below some threshold needed to transfer data for the conversation. At that point, the conversation may be cached or stored within a mobile phone for retransmission if the signal is dropped.

Figure 2:
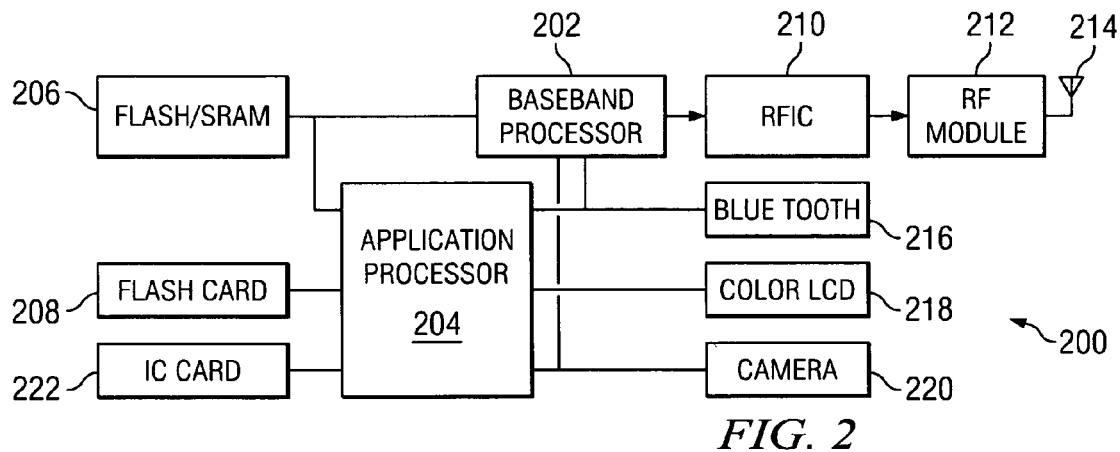
FIG. 2 is a block diagram of a camera phone in accordance with a preferred embodiment of the present invention.

Turning next to FIG. 2, a block diagram of a camera phone is depicted in accordance with a preferred embodiment of the present invention. Camera phone 200 is an example of a mobile communications device in which the present invention may be implemented. In particular, computer instructions and/or hardware may be implemented within camera phone 200 to detect weak signals and cached data, such as voice data or text data for retransmission at a later time when the signal reaches a sufficient level such that the connection or link is reestablished to allow the transfer of the data from the caller to the callee. Camera phone 200 includes baseband processor 202, application processor 204, flash/static random access memory (SRAM) 206, flash card 208, radio frequency integrated circuit (RFIC) 210, radio frequency (RF) module 212, antenna 214, Blue Tooth unit 216, color liquid crystal display (LCD) 218, camera 220, and IC card 222.

Baseband processor 202 provides for receiver and transmitter operations and is also referred to as a transceiver. In particular, baseband processor 202 handles all of the audio, signal, and data processing needed to receive and send data using RF transmissions or Blue Tooth transmissions. Application processor 204 provides the processing power for other functions within camera phone 200. For example, calculators, calendars, alarms, camera functions, and directories are provided through application processor 204. Flash/SRAM 206 is a storage device in which various instructions for providing the functions within camera phone 200 are located and provide upgrades. Flash card 208 is a storage device in which user data and applications may be stored. An example of flash card 208 is a secure digital card.

A pathway for the transmission of voice and other types of data is through RFIC 210. Additionally, short-range transmissions may be sent or received through Blue Tooth unit 216. Blue Tooth unit 216 conforms to Blue Tooth wireless specification, which defines the link layer and application layer for product developers. Both of these transmissions are made through antenna 214 in this illustrative example.

Color LCD 218 provides a display for pictures and other data for camera phone 200. Camera 220, in this example, is a complementary metal oxide semiconductor (CMOS) camera which may be built into camera phone 200 or connected to camera phone 200 as a module, such as IC card 222. IC card 222 also may contain other application specific functions, such as a global positioning system (GPS) or other functions, such as a modem or additional memory.

Camera 220 forms the camera module of camera phone 200, while the other components form the digital phone module of camera phone 200 in these illustrative examples. Instructions or circuits are added to camera phone 200 to provide the weak signal detection and to store data, such as voice data or text for later retransmission. In these illustrative examples, a weak signal is a signal with a strength that is too low to support the transmission of voice data for a telephone conversation. In some cases, the signal may fall below a value or threshold level such that voice data cannot be transmitted, but can still maintain a communications link between the two parties. In other cases, the signal may drop to a level such that the communications link is lost altogether.

Figure 3:
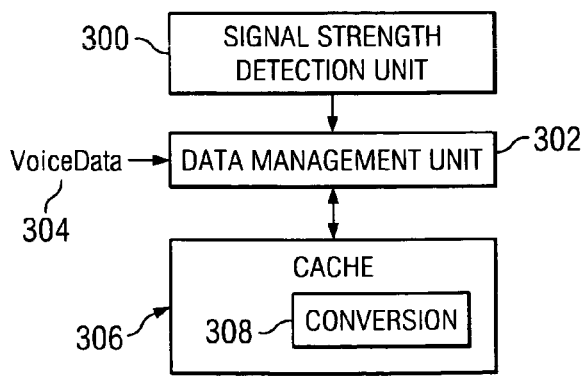
FIG. 3 is a diagram illustrating components used to transfer data and detect weak signals in accordance with a preferred embodiment of the present invention.

With reference now to FIG. 3, a diagram illustrating components used to transfer data and detect weak signals is depicted in accordance with a preferred embodiment of the present invention. In this example, signal strength protection unit 300 is employed to detect the signal strength between the mobile device and the tower or base station with which the mobile device is transmitting data. Signal strength protection unit 300 may be implemented using a circuitry currently found in mobile devices for detecting and presenting signal strengths to users. Signal strengths detected by signal strength unit 300 are provided to data management unit 302. This particular component determines whether the signal strength for the mobile device has fallen below a particular value or threshold level. If the signal detected by signal strength unit 300 falls below the selected threshold level, data management unit 302 stores voice data 304 in cache 306. In particular, voice data 304 is stored as conversation 308 within cache 306 in these illustrative examples. If the communications link is lost, conversation 308 may be retransmitted to the other party in the conversation when the communications link is reestablished. In these depicted examples, the communications link is considered to be lost when data, such as a voice conversation, can no longer be received by the other party to the conversation.

Additionally, if the communications link is not lost, conversation 308 may be discarded when the signal strength exceeds the threshold level or a second threshold level. In this case, the communications link was never lost and the data for the call was received by the communications device. These two threshold levels may be the same or may be set at different values.

Additionally, data management unit 302 may automatically send conversation 308 when the communications link is reestablished. Such a transmission of conversation 308, however, is a setup preference. Alternatively, the user may be prompted to determine whether to transmit conversation 308. Further, when the signal falls below the first threshold level, an alert may be provided to the user to indicate that a possible and impending disconnection may occur.

In these illustrative examples, if the signal is lost, voice data 304 continues to be stored as conversation 308 in cache 306 until the user stops speaking, realizing that the signal has been lost. Also, an alert may be given to the user when the signal falls below the threshold and/or when signal is lost for the communication link.

Turning now to FIG. 4, a flowchart of a process for transferring data and detecting weak signals is depicted in accordance with a preferred embodiment of the present invention. The process illustrated in FIG. 4 may be implemented in a data management unit, such as data management unit 302 in FIG. 3.

The process begins by receiving a signal strength for a communications link (step 400). A determination is made as to whether the signal strength is less than a first threshold (step 402). If the signal strength is not less than a first threshold, the process returns to step 400 as described above.

If in step 402, the signal strength is less than a first threshold, a warning indication is generated (step 404). This warning indication is an alert that may take various forms. For example, the alert may be a visible alert, such as an animation or flashing graphic on the display of the mobile phone. Alternatively, the indication may take the form of an audible alert, such as a beep or other sound being generated by the mobile phone. A combination of the two also may be used. This alert is used to indicate that impending or potential loss of the communications link may occur.

The process then begins storing data in a cache (step 406). The process stores data even though the communications link is still present in the illustrative examples. In this manner, if the data is retransmitted, the callee may be able to identify the context of the conversation when some portion of the conversation is repeated in the retransmission.

Next, a signal strength is received (step 408). A determination is made as to whether the signal strength exceeds a second threshold (step 410). If the second threshold is not exceeded, a determination is made as to whether the communications link has been lost (step 412). In these examples, the communications link is lost when data can no longer be received by the callee or communications device receiving the data. If the communications link has not been lost, the process returns to step 406. Otherwise, a determination is made as to whether the communications link has been reestablished (step 414). If the communications link has been reestablished, then the user is prompted to send the stored data (step 416). A determination is made as to whether the user input received is to send the stored data (step 418). If the user input is to send the stored data, then the data is sent (step 420) with the process then returning to step 400 as described above.

With reference again to step 418, if the user input is not to send stored data, the process discards the stored data (step 422). The stored data also is discarded in step 422 if the signal exceeds a second threshold in step 410. If the communications link is never reestablished in step 414, the process terminates.

In sending the stored data, this data may be sent in various forms. For example, the data may be sent as voice. Alternatively, the voice may be converted into text. If the stored data was originally in the form of text, this data may be transmitted into audio.

Thus, the present invention provides an improved method, apparatus, and computer instructions for transferring data in a manner that avoids a user having to repeat a conversation. The mechanism of the present invention detects a signal that falls below a threshold and warns the user of a possible and impending disconnection or loss of the communications link. If the communications link is lost without the user's knowledge, the conversation or data transfer between the users is stored in the mobile device. When the signal has improved, to allow for the transfer of data, the user is alerted and provided with an option to send the cached data. This option may involve selecting a format in addition to whether the data is to be sent after the interruption has occurred.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrative examples show the mechanism of the present invention being implemented in a mobile phone in which the data is a voice conversation. The mechanism of the present invention may be applied to other types of communications devices using wireless communications links. For example, the mechanism may be implemented in a laptop computer, a satellite transmitter, or wireless personal digital assistant (PDA). Additionally, the mechanism may be applied to data, such as text files or programs, in addition to a voice conversation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a wireless communications device for transferring data, the method comprising:
receiving a signal strength for a communications link used to transfer data to a destination;
responsive to the signal strength for the communication link being less than a threshold and the communication link is still maintained between the wireless communication device and the destination, caching the data in the wireless communications device to form cached data and generating a warning indication;
responsive to the caching of the data, receiving another signal strength for the communication link;
responsive to the another signal strength for the communication link exceeding another threshold that is below the threshold, halting the caching of the data;
responsive to the another signal strength for the communication link not exceeding the another threshold, determining if the communication link has been lost, and if so, determining if the communication link has subsequently been reestablished;
responsive to the subsequent reestablishment of the communications link, sending the cached data to the destination, wherein the sending step includes prompting a user of the wireless communications device to indicate whether to send the cached data to the destination and, responsive to a user input to send the cached data to the destination, sending the cached data to the destination, wherein the sending step further includes (i) discarding the cached data in an absence of the indication to send the cached data to the destination, and (ii) discarding the cached data responsive to the signal strength for the communication link exceeding the another threshold.

2. The method of claim 1, wherein the data is at least one of voice data and text data.

3. The method of claim 1, wherein the wireless communications device is one of a mobile phone, wireless personal digital assistant, or a laptop computer with a wireless adapter.

4. A wireless communications device for transferring data, the wireless communications device comprising:
receiving means for receiving a signal strength for a communications link used to transfer data to a destination;
means, responsive to the signal strength for the communication link being less than a threshold and the communication link is still maintained between the wireless communication device and the destination, for caching the data in the wireless communications device to form cached data and generating a warning indication;
means, responsive to the caching of the data, for receiving another signal strength for the communication link;
means, responsive to the another signal strength for the communication link exceeding another threshold that is below the threshold, for halting the caching of the data;
means, responsive to the another signal strength for the communication link not exceeding the another threshold, for determining if the communication link has been lost, and if so, determining if the communication link has subsequently been reestablished;
sending means, the subsequent reestablishment of the communications link, for sending the cached data to the destination, wherein the sending means includes prompting means, responsive to the loss of the communication link and the subsequent reestablishment of the communications link with the destination, for prompting a user of the wireless communications device to indicate whether to send the cached data to the destination and sending means, responsive to a user input to send the cached data to the destination, for sending the cached data to the destination, wherein the sending means further includes (i) means for discarding the cached data in an absence of the indication to send the cached data to the destination, and (ii) means for discarding the cached data responsive to the signal strength for the communication link exceeding the another threshold.

5. The wireless communications device of claim 4, wherein the data is at least one of voice data and text data.

6. The wireless communications device of claim 4, wherein the wireless communications device is one of a mobile phone, wireless personal digital assistant, or a laptop computer with a wireless adapter.

7. A computer program product in a computer recordable-type media for a wireless communications device transferring data, the method comprising: first instructions for receiving a signal strength for a communications link used to transfer data to a destination; second instructions, responsive to the signal strength for the communication link being less than a threshold and the communication link is still maintained between the wireless communication device and the destination, for caching the data in the wireless communications device to form cached data and generating a warning indication; third instructions, responsive to the caching of the data, for receiving another signal strength for the communication link; fourth instructions, responsive to the another signal strength for the communication link exceeding another threshold that is below the threshold, for halting the caching of the data; fifth instructions, responsive to the another signal strength for the communication link not exceeding the another threshold, for determining if the communication link has been lost, and if so, determining if the communication link has subsequently been reestablished; sixth instructions, responsive to a loss of the communication link and the subsequent reestablishment of the communications link, for sending the cached data to the destination, wherein the third instructions includes first sub-instructions, responsive to the loss of the communication link and the subsequent reestablishment of the communications link with the destination, for prompting a user of the wireless communications device to indicate whether to send the cached data to the destination and second sub-instructions, responsive to a user input to send the cached data to the destination, for sending the cached data to the destination, wherein the sixth instructions further includes (i) sub-instructions for discarding the cached data in an absence of the indication to send the cached data to the destination, and (ii) sub-instructions for discarding the cached data responsive to the signal strength for the communication link exceeding the another threshold.

8. The computer program product of claim 7, wherein the data is at least one voice data and text data.

9. The computer program product of claim 7, wherein the wireless communications device is one of a mobile phone, wireless personal digital assistant, or a laptop computer with a wireless adapter.

* * * * *